US008572670B2

(12) United States Patent
Asami (10) Patent No.: US 8,572,670 B2
(45) Date of Patent: Oct. 29, 2013

(54) VIDEO DISTRIBUTION DEVICE, VIDEO DISTRIBUTION SYSTEM, AND VIDEO DISTRIBUTION METHOD (75) Inventor: Kazuo Asami, Tokyo (JP)

(73) Assignee: NEC Corporation, Tokyo (JP)

( * ) Notice: Subject to any disclaimer, the term of this patent is extended or adjusted under 35 U.S.C. 154(b) by 489 days.

(21) Appl. No.: 12/866,827

(22) PCT Filed: Feb. 18, 2009

(86) PCT No.: PCT/JP2009/052785
§ 371 (c)(1),
(2), (4) Date: Aug. 9, 2010

(87) PCT Pub. No.: WO2009/104639
PCT Pub. Date: Aug. 27, 2009

(65) Prior Publication Data
US 2011/0010748 A1 Jan. 13, 2011

(30) Foreign Application Priority Data

Feb. 20, 2008 (JP) ................................. 2008-038818

(51) Int. Cl.
*H04N 7/173* (2011.01)
*H04N 7/12* (2006.01)
*H04N 5/935* (2006.01)
*H04N 7/24* (2011.01)

(52) U.S. Cl.
USPC .... 725/136; 375/240.11; 386/201; 348/398.1

(58) Field of Classification Search
USPC ............ 725/136, 146, 152, 116; 375/240.11, 375/240.23, 240.26, 240.1; 386/201; 348/398.1, 399.1, 512
See application file for complete search history.

(56) References Cited

U.S. PATENT DOCUMENTS

| 7,941,029 B2 * | 5/2011 | Horita et al. ................... 386/210 |
| 2005/0117641 A1 * | 6/2005 | Xu et al. ................... 375/240.08 |
| 2006/0109915 A1 * | 5/2006 | Unger ....................... 375/240.27 |
| 2006/0156201 A1 * | 7/2006 | Zhang et al. .................. 714/776 |
| 2008/0025413 A1 * | 1/2008 | Apostolopoulos ....... 375/240.26 |
| 2008/0101466 A1 * | 5/2008 | Swenson et al. ......... 375/240.07 |
| 2011/0010748 A1 * | 1/2011 | Asami ........................... 725/116 |

FOREIGN PATENT DOCUMENTS

| JP | 2002354419 A | 12/2002 |
| JP | 2004180224 A | 6/2004 |
| JP | 2005130428 A | 5/2005 |
| JP | 2005277803 A | 10/2005 |
| JP | 2006295645 A | 10/2006 |
| WO | 2006101681 A | 9/2006 |

OTHER PUBLICATIONS

International Search Report for PCT/JP2009/052785 mailed Mar. 17, 2009.

* cited by examiner

*Primary Examiner* — Pankaj Kumar
*Assistant Examiner* — Reuben M Brown (57) ABSTRACT

To provide a video distribution device which can realize a smooth change of reproduction speed without increasing a data transfer rate from the time of a normal reproduction and decrease a decoding load even when the reproduction speed is changed.

The video distribution device which distributes a video content composed of a basic signal and one or more extended signals that are hierarchically configured includes content read-out means for reading out the basic signal and the extended signal in the video content at mutually independent bit rates and reproduction speed change means for changing a content reproduction speed by specifying a read-out bit rate for each signal to the content read-out means.

30 Claims, 8 Drawing Sheets

| LAYER TYPE | LAYER IDENTIFIER | BIT RATE |
|---|---|---|
| BASE LAYER | 1 | 1Mbps |
| FIRST ENHANCEMENT LAYER | 2 | 1Mbps |
| SECOND ENHANCEMENT LAYER | 3 | 1Mbps |

Fig.5

| | | RTP TIME STAMP CLOCK RATE FOR EACH REPRODUCTION SPEED MULTIPLICATION RATIO | | | | |
|---|---|---|---|---|---|---|
| | REPRODUCTION SPEED MULTIPLICATION RATIO | 1.0 | 1.5 | 2.0 | 2.5 | 3.0 |
| | CLOCK RATE | 90kHz | 60kHz | 45kHz | 36kHz | 30kHz |
| | | READ-OUT BIT RATE FOR EACH LAYER FOR EACH REPRODUCTION SPEED MULTIPLICATION RATIO | | | | |
| | | READ-OUT BIT RATE | | | | |
| LAYER TYPE | LAYER IDENTIFIER | | | | | |
| SECOND ENHANCEMENT LAYER | 3 | 1Mbps | 0 | 0 | 0 | 0 |
| FIRST ENHANCEMENT LAYER | 2 | 1Mbps | 1.5Mbps | 0 | 0 | 0 |
| BASE LAYER | 1 | 1Mbps | 1.5Mbps | 2Mbps | 2.5Mbps | 3Mbps |
| TOTAL BIT RATE | | 3Mbps | 3Mbps | 2Mbps | 2.5Mbps | 3Mbps |

VIDEO DISTRIBUTION DEVICE, VIDEO DISTRIBUTION SYSTEM, AND VIDEO DISTRIBUTION METHOD

This application is the National Phase of PCT/JP2009/052785, filed Feb. 18, 2009, which claims priority based on the Japanese application Japanese Patent Application No. 2008-038818 filed on Feb. 20, 2008 and the disclosure of which is hereby incorporated in its entirety.

The present invention relates to a video distribution device, a video distribution system and a video distribution method. In particular, the present invention relates to a technology which is preferably applied to a distribution service of a video content for which a high bit rate and a real time property are required.

BACKGROUND ART

In recent years, a network service such as a FTTH (Fiber To The Home), a NGN (Next Generation Network), or the like is provided. By using such a network service, a high speed and high quality network connection environment can be used in a home. Because a high speed and high quality network has been able to be used, an infrastructure which uses a distribution service of a video content that requires a high bit rate and a real time property has been improved. A content distribution service such as a VoD (Video on Demand) in which a user views a desired content among the contents provided by a provider is provided. Moreover, in some countries, a new video viewing service has started in which a user views a content in response to a user's selection of broadcast content or in response to a user's selection of content automatically recorded on a server. This new video viewing service is called a nDVR (network-based Digital Video Recorder).

When the video content is viewed via a network like a television broadcast, a video distribution server performs only a process in which a stream is transmitted to a player in order from the beginning of the content. However, a video service such as the VoD, the nDVR, or the like in which the stored content is distributed according to the user's request provides a trick play function such as fast-forwarding, rewinding, and halt. In particular, in the nDVR in which the broadcast content is automatically recorded, the user frequently uses the fast-forwarding or the like to find out a scene that the user wants to view from the recorded result. Consequently, the trick play function has become important than ever before.

An example of a method of fast forwarding a stored content is described in patent document 1. In this method, a read-out process is executed at a double rate to realize the fast-forwarding at double speed. Moreover, in this method, a value of time information related to decoding and reproduction that is added in data is changed to half of the value and the decode process and the reproduction process are performed according to the changed time information. Whereby, in the method disclosed in the patent document 1, the fast-forwarding of the content at the double speed is realized.

An example of another method of fast forwarding a stored content is disclosed in patent document 2. In this method, a thinning process is performed in a frame unit according to the specified fast forwarding multiplication ratio, and then the decoding is performed. In the method disclosed in the patent document 2, the thinning process is performed in a frame unit. As a result, the method disclosed in the patent document 2 realizes the fast-forwarding by realizing a skip of an image frame.

[patent document 1] Japanese Patent Application Laid-Open No. 2002-354419
[patent document 2] Japanese Patent Application Laid-Open No. 2006-295645

DISCLOSURE OF THE INVENTION

Problems to be Solved by the Invention

However, in the method of fast forwarding a stored content disclosed in the patent document 1, when a fast forward reproduction is performed at double speed, a transfer rate of transferring data to a decoder becomes double. It means that a network needs double bandwidth in the video distribution service in which a content distribution side and a content reproduction side are separated by the network. Additionally, in this video distribution service, a processing amount per unit time of the decode process becomes double. For this reason, in the method of the patent document 1, when the fast forward reproduction is performed, a network resource or a processor for decoding is a bottleneck. Therefore, the usable fast forwarding multiplication ratio is low.

In the method of fast forwarding a stored content of the patent document 2, in order to realize the fast forward reproduction, the thinning of a stream is performed in a frame unit at a server side. By this thinning, because the frame which is not displayed is generated in a content reproduction side, a user sees the video so that the video skips. Therefore, when the content is reproduced at a high fast forwarding multiplication ratio, it becomes difficult to perform an operation in which a desired scene is found and a reproduction mode is returned to a normal mode that is an object of the fast forward reproduction.

Accordingly, the present invention is made in view of the above described situation. An object of the present invention is to provide a video distribution device in which a reproduction speed can be changed smoothly without increasing a data transfer rate from the time of a normal reproduction and decoding load can be reduced even when the reproduction speed is changed, a video distribution system, or the like.

Means for Solving the Problems

In order to solve the above-mentioned problem, a first video distribution device of the present invention is a video distribution device which distributes a video content including a basic signal and one or more extended signals that are hierarchically composed.

The first video distribution device includes
  content read-out means for reading out the basic signal and the extended signal in the video content at mutually independent bit rates and
  reproduction speed change means for changing a content reproduction speed by specifying a read-out bit rate for each signal to the content read-out means.

A first video reception device of the present invention is a video reception device which receives the video content including the basic signal and one or more extended signals that are hierarchically composed from the video distribution device.

The first video reception device of the present invention includes
  reproduction speed change request means for transmitting a reproduction speed multiplication ratio change request of the video content to the video distribution device which reads out the basic signal and the extended signal in the video content at mutually independent bit rates and changes the reproduction speed of the video content by specifying the read-out bit rate for each signal and decode means for performing a video decode process in accordance with time information added in the video content received from the video distribution device.

A first video distribution system of the present invention is a video distribution system that includes the video distribution device which distributes the video content including the basic signal and one or more extended signals that are hierarchically composed and the video reception device which receives the video content distributed by the video distribution device.

In the first video distribution system,
the video distribution device includes
the content read-out means for reading out the basic signal and the extended signal in the video content at the mutually independent bit rates and the reproduction speed change means for changing the content reproduction speed by specifying the read-out bit rate for each signal to the content read-out means, and the video reception device includes
the reproduction speed change request means for transmitting the reproduction speed multiplication ratio change request of the video content to the video distribution device and the decode means for performing the video decode process in accordance with the time information added in the video content received from the video distribution device.

A first video reproduction device of the present invention is a video reproduction device in which the video distribution device for distributing the video content including the basic signal and one or more extended signals that are hierarchically composed and the video reception device for receiving the video content distributed by the video distribution device are included and both devices are connected by a bus.

In the first video reproduction device,
the video distribution device includes
the content read-out means for reading out the basic signal and the extended signals in the video content at mutually independent bit rates and the reproduction speed change means for changing the content reproduction speed by specifying the read-out bit rate for each signal to the content read-out means and the video reception device includes
the reproduction speed change request means for transmitting the reproduction speed multiplication ratio change request of the video content to the video distribution device and the decode means for performing the video decode process in accordance with the time information added in the video content received from the video distribution device.

A first video distribution method of the present invention is a video distribution method with which the video content including the basic signal and one or more extended signals that are hierarchically composed is distributed.

The first video distribution method includes
a reproduction speed change step in which the content reproduction speed is changed by specifying the read-out bit rate for each signal with respect to the basic signal and the extended signal in the video content, and a content read out step in which the respective signals are read out at the mutually independent bit rates in accordance with the bit rate specified in the reproduction speed change step.

A first video reception method of the present invention is a video reception method with which the video content including the basic signal and one or more extended signals that are hierarchically composed is received from the video distribution device.

The first video reception method includes a reproduction speed change request step in which the reproduction speed multiplication ratio change request of the video content is transmitted to the video distribution device which reads out the basic signal and the extended signal in the video content at the mutually independent bit rates and changes the reproduction speed of the video content by specifying the read-out bit rate for each signal and a decode step in which the video decode process is performed in accordance with the time information added in the video content received from the video distribution device.

A first program of the present invention is a program used in the video distribution device which distributes the video content including the basic signal and one or more extended signals that are hierarchically composed.

The first program causes a computer to execute
a reproduction speed change function by which the content reproduction speed is changed by specifying the read-out bit rate for each signal with respect to the basic signal and the extended signal in the video content and a content read-out function by which the respective signals are read out at the mutually independent bit rates in accordance with the bit rate specified by the reproduction speed change function.

A second program of the present invention is a program used in the video reception device which receives the video content including the basic signal and one or more extended signals that are hierarchically composed from the video distribution device.

The second program causes a computer to execute
a reproduction speed change request function by which the reproduction speed multiplication ratio change request of the video content is transmitted to the video distribution device which reads out the basic signal and the extended signal in the video content at the mutually independent bit rates and changes the reproduction speed of the video content by specifying the read-out bit rate for each signal and a decode function by which the video decode process is performed in accordance with the time information added in the video content received from the video distribution device.

A first recording medium of the present invention is a computer-readable recording medium that records the above-mentioned program.

Effect of the Invention

According to the present invention, a smooth change of reproduction speed can be realized without increasing a data transfer rate from the time of a normal reproduction. Further, according to the present invention, the decoding load can be reduced even when the reproduction speed is changed.

BEST MODE FOR CARRYING OUT THE INVENTION

The present invention is characterized in that, in the video distribution device which distributes the video content to the video reception device via the network, a distribution rate of a base layer stream essential to the reproduction and an enhancement layer stream whose distribution is not stopped is increased by stopping the distribution of the whole or a part of the enhancement layer stream, thereby, a video reproduction rate is changed while maintaining a use bandwidth of the whole network constant. The present invention will be described in detail below based on an exemplary embodiment.

Figure 1:
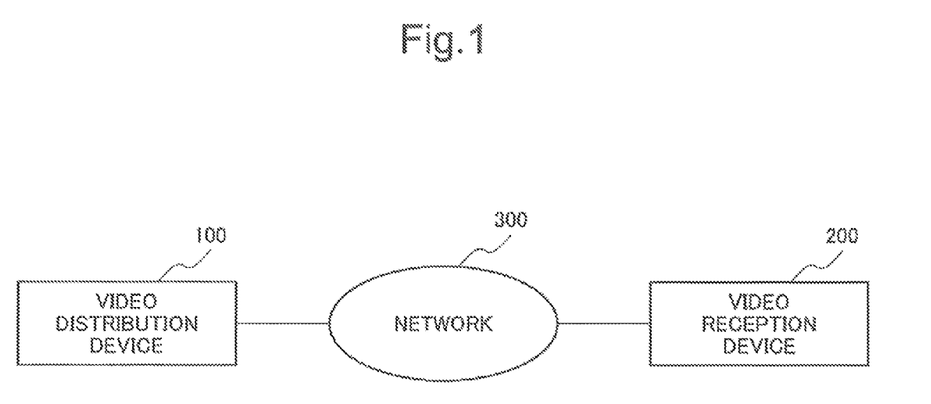
FIG. 1 is a schematic view showing a configuration of a video distribution system according to an exemplary embodiment of the present invention.

First, as an exemplary embodiment of the present invention, a configuration of the video distribution system including the video distribution device and the video reception device will be described. FIG. 1 is a schematic view showing a configuration of the video distribution system of the exemplary embodiment of the present invention. A video distribution device 100 and a reception device 200 of which the video distribution system of this exemplary embodiment is configured are terminals which can communicate with each other by a network 300. The distribution device 100 holds the video content. The distribution device 100 is a device which distributes the stored video content to the video reception device 200 on the network 300. The video reception device 200 is a device which receives the video content from the video distribution device 100 on the network 300 and reproduces the received video content. The network 300 is a network which enables the communication between the terminals.

The exemplary embodiment will be described based on the assumption that the network 300 is the Internet. However, this exemplary embodiment is not limited to a server device or a PC (Personal Computer) and the Internet. The network 300 may be a NGN, a mobile telephone network, a wireless LAN (Local Area Network), a bus in a device, or the like. In this exemplary embodiment, it is expected that the video distribution device 100 is a streaming server. However, the video distribution device 100 may be a PC, a HDD (Hard Disk Drive) recorder, or the like. In this exemplary embodiment, it is expected that the video reception device 200 is the PC. However, the video reception devices 200 may be a mobile phone, a PDA (Personal Digital Assistant), a television set which can connect to the network, a game unit connected to the television set, or the like.

Figure 2:
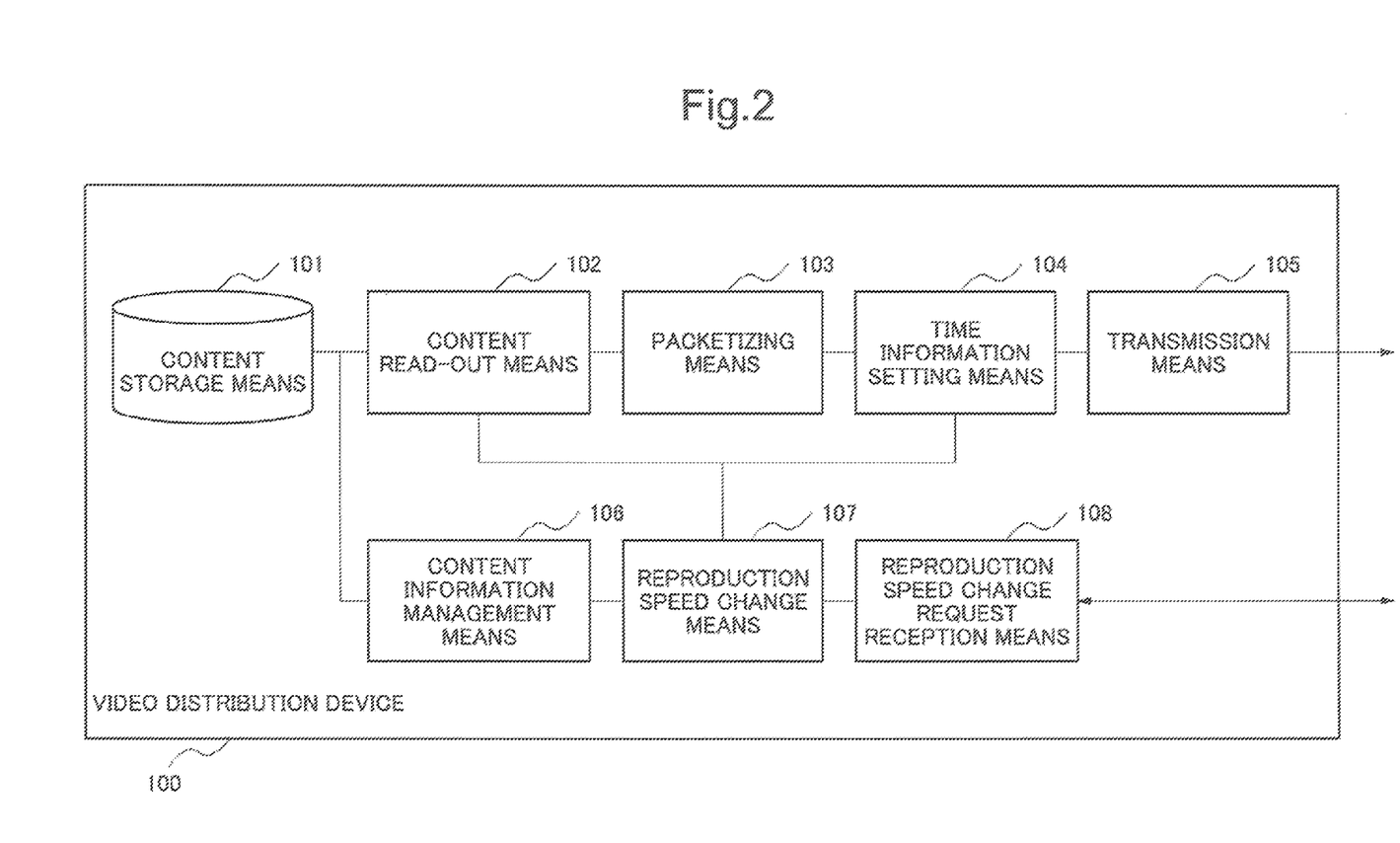
FIG. 2 is a functional block diagram showing a configuration of a video distribution device according to an exemplary embodiment of the present invention.

Next, a configuration of the video distribution device will be described. FIG. 2 is a functional block diagram showing the configuration of the video distribution device in this exemplary embodiment. The video distribution device 100 is composed of content storage means 101, content read-out means 102, packetizing means 103, time information setting means 104, transmission means 105, content information management means 10, reproduction speed change means 107, and reproduction speed change request reception means 108. These means operate as follows.

The content storage means 101 is a storage medium in which the video content encoded by using a scalable codec is stored. In this exemplary embodiment, the video content is compressed by a H.264/SVC (Scalable Video Coding) encoder. In this exemplary embodiment, this video content is composed of the base layer and two enhancement layers (a first enhancement layer and a second enhancement layer). The first enhancement layer is a bit stream located at a higher position than the base layer. In this exemplary embodiment, the bit stream of the first enhancement layer is decoded together with the bit stream of the base layer. As a result, by this exemplary embodiment, the video content of image quality can be obtained compared to a result obtained by decoding only the bit stream of the base layer. The second enhancement layer is a bit stream located at a higher position than the first enhancement layer. In this exemplary embodiment, the bit stream of the second enhancement layer is decoded together with the bit stream of the base layer and the bit stream of the first enhancement layer. As a result, by this exemplary embodiment, the video content of image quality can be obtained compared to a result obtained by decoding only the bit stream of the base layer and the bit stream of the first enhancement layer.

In this exemplary embodiment, a SN scalable setting is used. Namely, the base layer is encoded at a bit rate setting of Bb=1 Mbps. The second enhancement layer is encoded at the bit rate setting of Be1=1 Mbps. The second enhancement layer is encoded at the bit rate setting of Be2=1 Mbps. As a result, in this exemplary embodiment, a file whose total bit stream is 3 Mbps is used. However, the bit rate setting of the base layer, the bit rate setting of the enhancement layer, the division number of the layer, or the like is shown as an example and the other value may be used. The present invention is effective when the setting is not only the SN scalable setting but also a space scalable setting, a time scalable setting, or the like.

Figure 3:
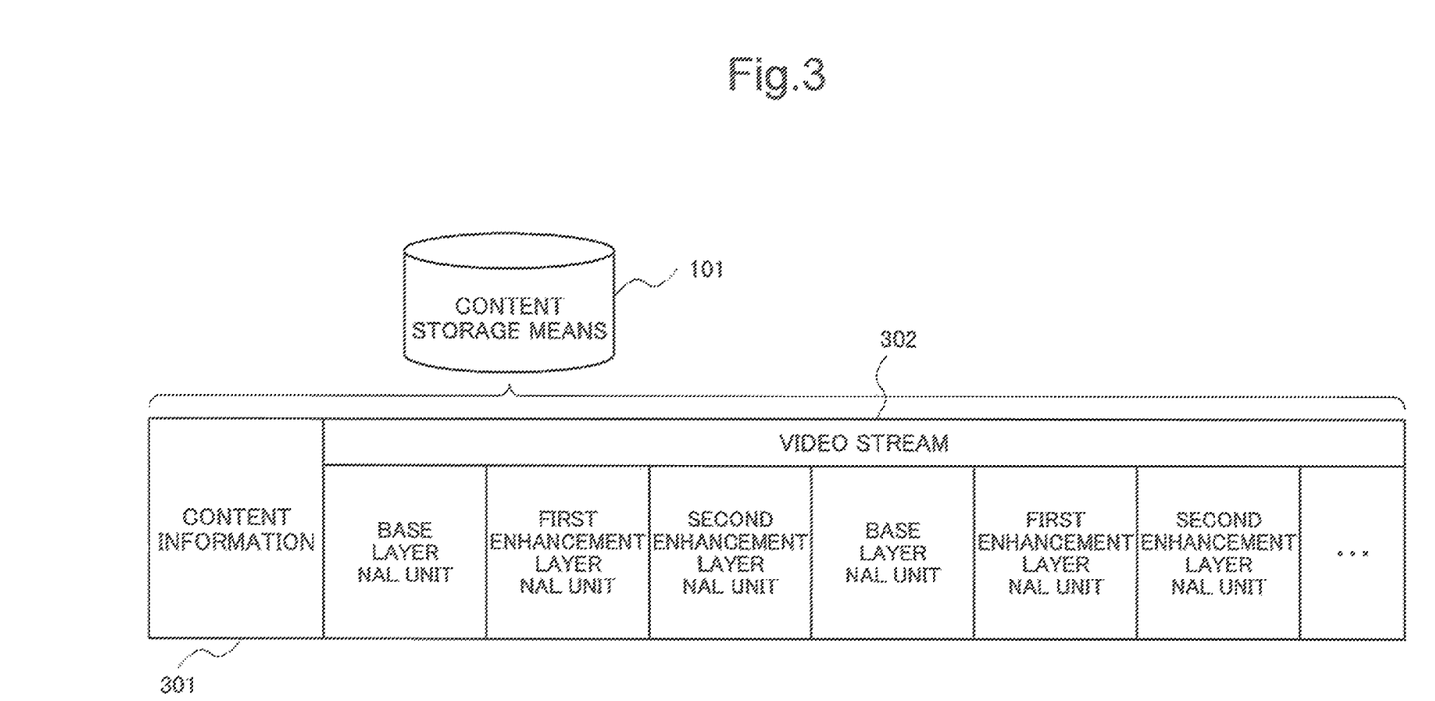
FIG. 3 is a view for illustrating a data structure of a video content distributed in an exemplary embodiment of the present invention.
Figure 4:
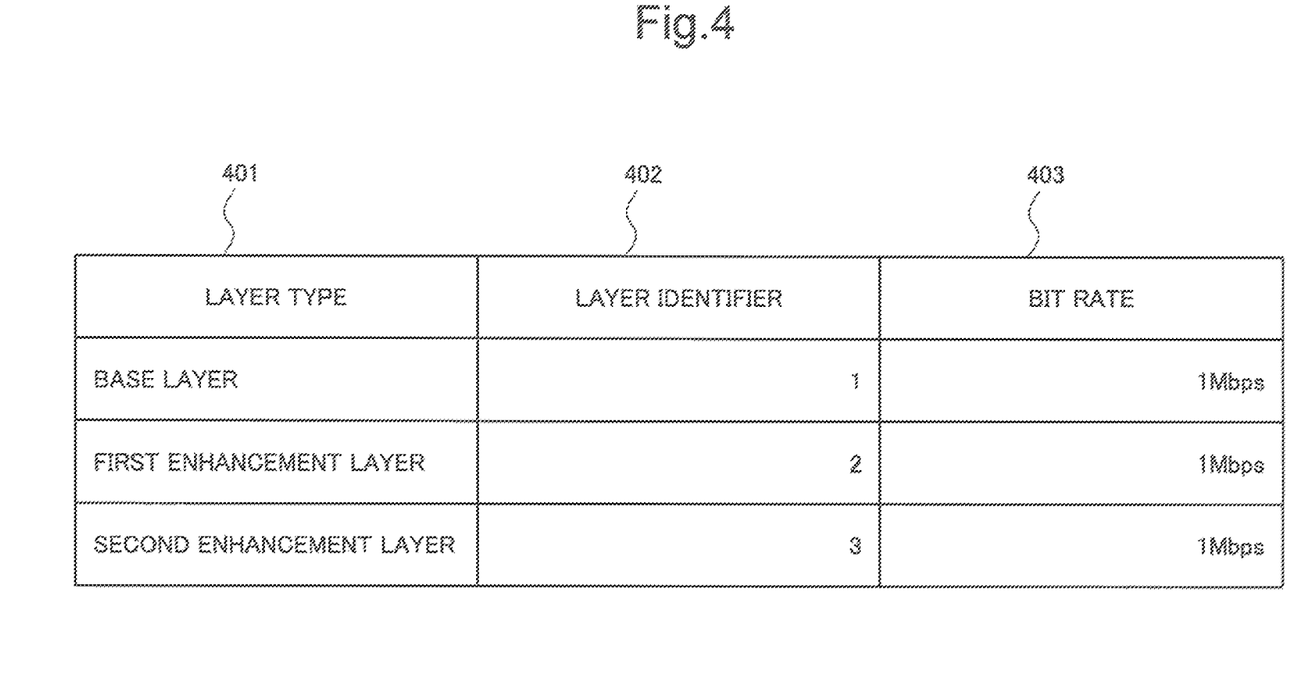
FIG. 4 is a view for illustrating a data structure of a video content distributed in an exemplary embodiment of the present invention.

The content stored in the content storage means 101 includes information shown in FIG. 3. Content information 301 is data used at the time of content distribution and includes information shown in FIG. 4. A layer type 401 is information indicating a layer of which the content is composed. A layer identifier 402 is an identifier for associating a NAL (Network Abstraction Layer) unit of which a video stream 302 stored in the content is composed with each layer. A bit rate 403 is a bit rate for each layer.

A data structure of the content mentioned above is an example in this exemplary embodiment and the other format may be used. For example, a case in which the content information 301 is separated to another file or a case in which a format of the video stream 302 is the other format such as MPEG (Motion Picture Expert Group)-2TS (Transport Stream) format, or the like corresponds to the other format. An arbitrary format of which the content read-out means 102 can read out the content in a layer unit and bit rate information on each layer can be obtained can be used as the other format. In this exemplary embodiment, an explanation about voice data is omitted for easy explanation.

The content information management means 106 is means for holding the content information 301 stored in the content storage means 101 and providing it to the reproduction speed change means 107 if needed. This information is used as the content information 301 stored in the content storage means 101 in this exemplary embodiment. However, in a case in which information is obtained from the other setting file, a case in which a message is received from an encoder that produces the content of the content storage means 101, or the like, the information may be obtained from the other source.

The content read-out means 102 is means for reading out the stream of the layer specified by the content storage means 101 at the specified bit rate. When the stream is read out, the content read-out means 102 receives specification about the layer to be read out in the content stored in the content storage means 101 and the read-out bit rate for each layer from the reproduction speed change means 107.

In the exemplary embodiment, at the time of a normal reproduction, the reproduction speed change means 107 instructs the content read-out means 102 to read out an identifier 1, an identifier 2, and an identifier 3 that are the layer identifier of the base layer, the layer identifier of the first enhancement layer and the layer identifier of the second enhancement layer, respectively and the each layer at the bit rate of 1 Mbps in order to transmit all streams from the base layer to the second enhancement layer to the video reception terminal 200. The content read-out means 102 reads out the H.264/SVC stream stored in the content storage means 101 and transmit the NAL units of the identifier 1, the identifier 2 and the identifier 3 to the packetizing means 103. When the fast forward reproduction is performed, the process is performed according to the read-out bit rate for each layer determined by the reproduction speed change means 107.

The packetizing means 103 is means for converting the NAL unit of the H.264/SVC transmitted by the content read-out means 102 into a packet in order to transmit it to the network 200. In this exemplary embodiment, a RTP (Real-time Transport Protocol) packet format based on IETF (Internet Engineering Task Force) draft-ietf-avt-rtp-svc-01 "RTP Payload Format for SVC Video" is adopted as a method of conversion into a packet. However, the other packetizing format such as MPEG-2 TS system or the like may be used as the method of conversion into a packet if it is a format of which time information can be added in the packet.

Time information setting means 104 is means for adding the time information in the packet generated by the packetizing means 103 at the specified clock rate. When a packetizing process is performed, the time information setting unit 104 receives the setting of the clock rate used for generating the time information from the reproduction speed change means 107. In this exemplary embodiment, at the time of the normal reproduction, the clock rate of 90 kHz which is a standard value specified in an RTP packetization standard is set. By this setting, the time information whose increasing rate is 90,000 per one second video content is added to a time stamp of an RTF header. When the fast forward reproduction is performed, a new clock rate is specified by the reproduction speed change means 107. After the time information setting means 104 adds the time information to an RTP time stamp, it transmits the packet to the transmission means 105.

The transmission means 105 is means for transmitting the packet to the network 300. In this exemplary embodiment, a process in which the packet is transmitted from a network interface card to the Internet by using a socket API (Application Program Interface) is performed. The transmission process is performed at a timing at which the packet is received from the time information setting means 104. When the network 300 is a NGN network, priority information may be added to an IP (Internet Protocol) packet of each layer.

The reproduction speed change request reception means 108 is means for receiving a reproduction speed change request message from the video reception device 200 connected via the network 300. In this exemplary embodiment, an RFC (Request For Comments) 2326 RTSP (Real Time Streaming Protocol) is used but the other communication protocols with which the reproduction speed change request can be made may be used.

When the reproduction speed change is requested to the video distribution device 100, the video reception device 200 transmits a message of which a Scale header indicating the reproduction speed multiplication ratio is added to a PLAY method. For example, when the fast forward reproduction at double speed is requested, the header that is "Scale: 2.0" is added to the PLAY method. When the reproduction speed change request reception means 108 receives the reproduction speed change request message, it notifies the reproduction speed change means 107 of the reproduction speed multiplication ratio change request. When a response to the reproduction speed change request is received from the reproduction speed change means 107, a reproduction speed change response message is transmitted to the video reception device 200 as an ACK method indicating it.

The reproduction speed change means 107 is means for acquiring the reproduction speed multiplication ratio from the reproduction speed change request reception means 108 and determining the change in the read-out bit rate of each layer of the video content. The reproduction speed change means 107 acquires the layer information and the bit rate information of the content distributed from the content information management means 106. The reproduction speed change means 107 receives the specification of a usable network bandwidth from the user.

Figure 5:
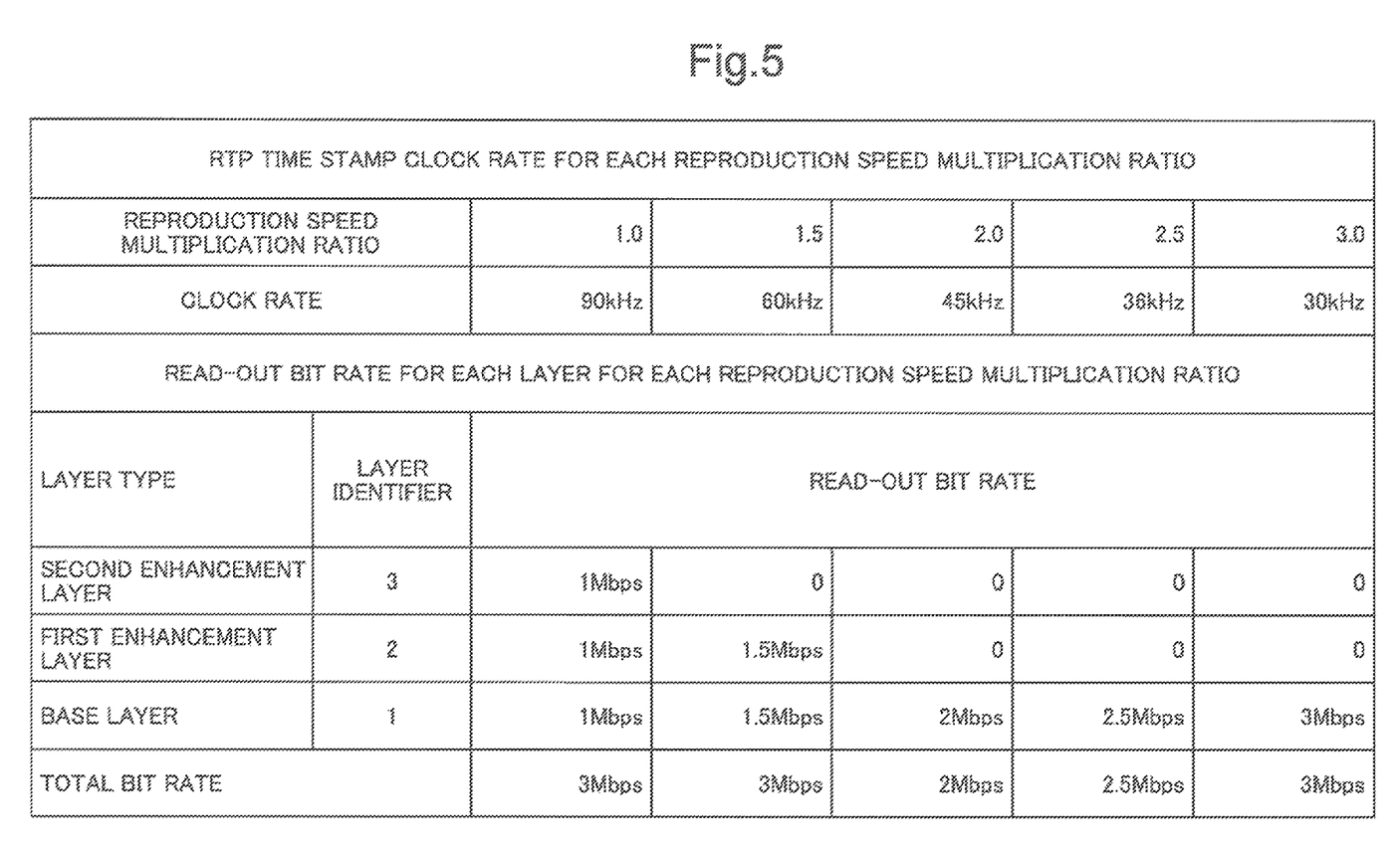
FIG. 5 is a view for illustrating a method for calculating a distribution bit rate for each layer in an exemplary embodiment of the present invention.

A method for calculating a distribution bit rate for each layer will be described with reference to FIG. 5. The reproduction speed change means 107 receives the specification of a usable network bandwidth Ball from the user. In this exemplary embodiment, it is assumed that the usable network bandwidth Ball is 3 Mbps. In this exemplary embodiment, the read-out bit rate of the base layer at the time of fast forward reproduction is calculated by multiplying the bit rate of the stream of the base layer by the reproduction speed multiplication ratio within a range not exceeding this usable network bandwidth Ball. For example, in this exemplary embodiment, the read-out bit rate is as follows: when the reproduction speed multiplication ratio is 1.5, Bb*1.5=1.5 Mbps, when the reproduction speed multiplication ratio is 2.0, Bb*2.0=2.0 Mbps, when the reproduction speed multiplication ratio is 2.5, Bb*2.5=2.5 Mbps, and when the reproduction speed multiplication ratio is 3.0, Bb*3.0=3.0 Mbps.

When the reproduction speed multiplication ratio is 1.5, the read-out bit rate of the base layer is 1.5 Mbps. In this case, a unused bandwidth is obtained from a difference between the usable network bandwidth Ball and the read-out bit rate of the base layer and it is 1.5 Mbps. Even when not only the base layer but also the first enhancement layer located at a higher position than the base layer are transmitted at the bit rate calculated by using the reproduction speed multiplication ratio of 1.5, a use bandwidth is (Bb*1.5)+(Be1*1.5)=3.0 Mbps. Therefore, in this case, the use bandwidth does not exceed the usable network bandwidth Ball.

Thus, if the use bandwidth does not exceed the usable network bandwidth Ball when the bit rate is increased by including the enhancement layer of higher hierarchy, a transmission process may be performed in which the enhancement layer of higher hierarchy is included. At this time, a fast forward video can be viewed on a reception terminal with a better quality than the video in which only the base layer is transmitted. However, in this exemplary embodiment, when the reproduction speed multiplication ratio exceeds 2.0, the read-out bit rate of the first enhancement layer is improved at the same rate as that of the base layer. In this case, the use bandwidth is (Bb*2.0)+(Be1*2.0)=4.0 Mbps and exceeds the usable network bandwidth Ball. In this case, a decision is made so that transmission of the first enhancement layer is not performed, a vacant bandwidth is left, and only the base layer is transmitted at 2.0 Mbps.

Further, in this exemplary embodiment, when the reproduction speed multiplication ratio exceeds 3.0, the base layer read-out bit rate exceeds the usable network bandwidth Ball. In this case, an error to the fast forwarding request is returned. The request source is notified of this error by the reproduction speed change request reception means 108. It is possible to concurrently use a process for transmitting the fast forward video whose reproduction speed multiplication ratio exceeds 3.0 by performing the frame thinning without returning the error.

A value exceeding the bit rate of the whole content can be set to the usable network bandwidth Ball. For example, when 6.0 Mbps is specified to the usable network bandwidth Ball, the whole use bandwidth is (Bb*1.5)+(Be1*1.5)+(Be2*1.5)= 4.5 Mbps when the reproduction speed multiplication ratio is 1.5, the whole use bandwidth is (Bb*2.0)+(Be1*2.0)+

(Be2*2.0)=6.0 Mbps when the reproduction speed multiplication ratio is 2.0, the whole use bandwidth is (Bb*2.5)+(Be1*2.5)+(Be2*0)=5.0 Mbps when the reproduction speed multiplication ratio is 2.5, and the whole use bandwidth is (Bb*3.0)+(Be1*3.0)+(Be2*0)=6.0 Mbps when the reproduction speed multiplication ratio is 3.0. In the exemplary embodiment, when the reproduction speed multiplication ratio is 1.5, the distribution of the second enhancement layer is added compared to a case in which 3.0 Mbps is specified to the usable network bandwidth Ball. When the reproduction speed multiplication ratio is 2.0, the distribution of the first and second enhancement layers is added. When the reproduction speed multiplication ratio is 2.5, the distribution of the first enhancement layer is added. When the reproduction speed multiplication ratio is 3.0, the distribution of the first enhancement layer is added. Accordingly, the fast forward reproduction with high image quality can be performed on the video reception terminal 200.

A method with which the setting of the usable network bandwidth Ball is omitted and a value obtained by adding the bit rates of all layers of the content is set as the usable network bandwidth Ball may also be used. In this case, in this exemplary embodiment, the usable network bandwidth Ball=Bb+Be1+Be2=3 Mbps. Additionally, the network bandwidth of the network 300 is measured separately and this measured value may be used.

At the time of fast forward reproduction, the reproduction speed change means 107 sets the new read-out bit rate of each layer that is calculated by the above-mentioned procedure to the content read-out means 102. As a result, a supply rate of data required for the fast forward reproduction is increased.

The reproduction speed change means 107 changes an RTP time stamp clock rate at the time of fast forward reproduction. The rate of 90 kHz is used at the time of normal reproduction. However, at the time of normal reproduction, the clock rate follows the fast forwarding multiplication ratio and it is changed to a value obtained by dividing the clock rate by the fast forwarding multiplication ratio. In this exemplary embodiment, when the fast forwarding multiplication ratio is 1.5, the clock rate is 90 kHz/1.5=60 kHz. When the fast forwarding multiplication ratio is 2.0, the clock rate is 90 kHz/2.0=45 kHz. When the fast forwarding multiplication ratio is 2.5, the clock rate is 90 kHz/2.5=36 kHz. When the fast forwarding multiplication ratio is 3.0, the clock rate is 90 kHz/3.0=30 kHz.

The reproduction speed change means 107 sets the new and changed RTP time stamp clock rate to the time information setting means 104 at the time of fast forward reproduction. As a result, the video reception device 200 can display the fast forward reproduction video by performing the decoding and the reproduction according to the RTP time stamp at the time of fast forward reproduction.

In this exemplary embodiment, the reproduction speed change means 107 performs the setting of the read-out bit rate and the setting of the clock rate. However, the setting of the read-out bit rate and the setting of the clock rate may be performed by the different means.

Figure 6:
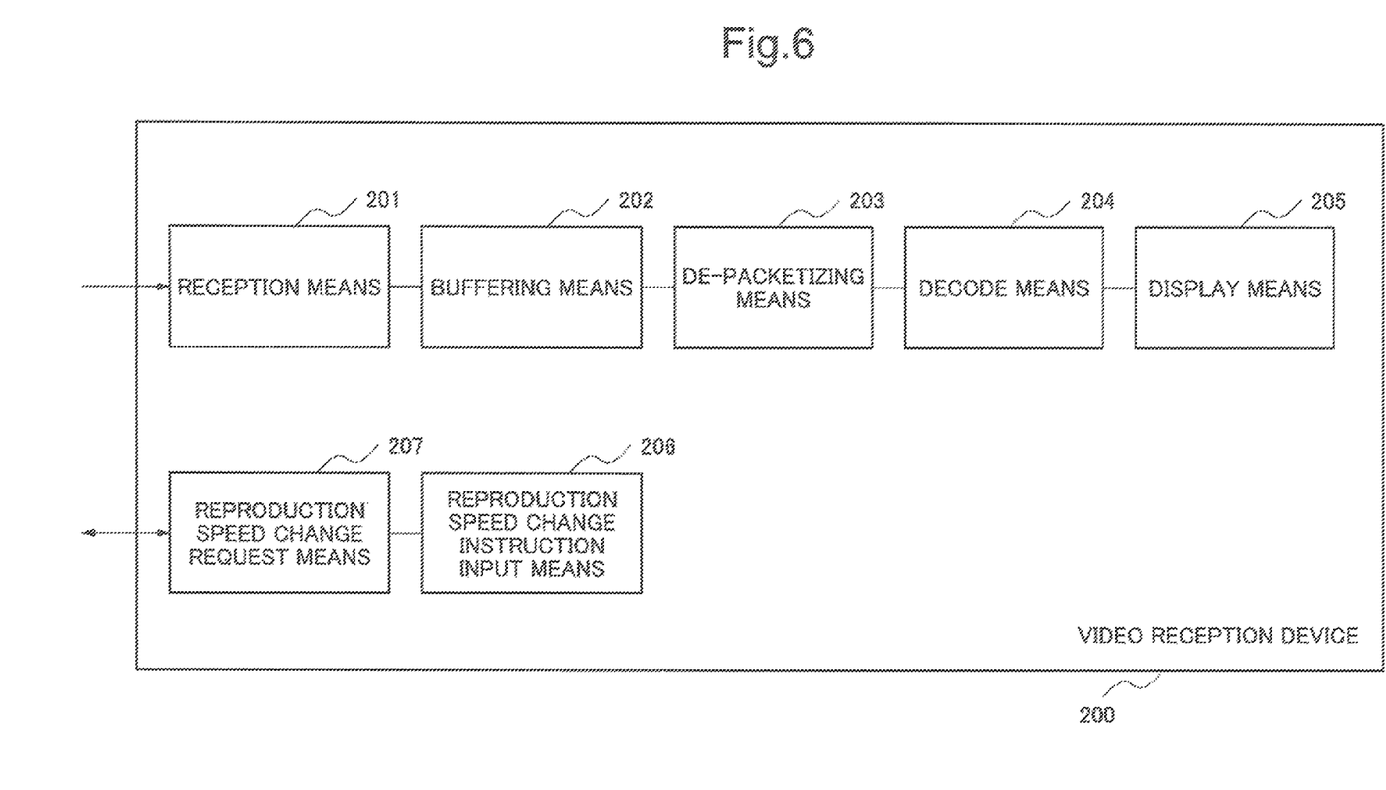
FIG. 6 is a functional block diagram showing a configuration of a video distribution device according to an exemplary embodiment of the present invention.

Next, a configuration of the video reception device will be described. FIG. 6 is a functional block diagram showing a configuration of the video reception device in this exemplary embodiment. The video reception device 200 is composed of reception means 201, buffering means 202, de-packetizing means 203, decode means 204, display means 205, reproduction speed change instruction input means 206 and reproduction speed change request means 207. These means operate as follows.

The reception means 201 is means for receiving a video stream sent from the video distribution device 100 connected via the network 300. In this exemplary embodiment, the reception means 201 connected to the Internet perform a process for receiving the RTP packet by using a socket API. The packet which has arrived at the reception means 201 is sent to the buffering means 202 immediately.

The buffering means 202 is means for buffering the received video stream for a reproduction process. By performing the buffering, the video reproduction can be performed at a constant frame rate without being affected by a jitter or the like on the network. A timing at which the packet is buffered is a time at which the RTP packet arrives at the reception means 201. The buffered packet is extracted by the de-packetizing means 203. The de-packetizing means 203 can extract one or more RTP packets from the buffering means 202. The RTP time stamp of each buffered RTP packet can be acquired to perform a determination of whether the decode means 204 perform the decode process.

The de-packetizing means 203 is means for receiving the instruction from the decode means 204, extracting the RTP packet from the buffering means 202, and acquiring the video stream. The de-packetizing means 203 receives the time information that is a decoding object from the decode means 204 and perform a process for extracting the RTP packet from the buffering means 202. The de-packetizing means 203 extracts one or more RTP packets of which the value of the RTP time stamp is less than the time information that is the decoding object, and extract and combine an RTP payload in order of an RTP sequence number. This combined RTP payload is a H.264/SVC elementary stream and is sent to the decode means 204.

The decode means 204 is means for decoding the H.264/SVC stream, and acquiring a bitmap video. The decode means 204 has a system clock therein, autonomously issue an extraction instruction of the packet and a de-packetizing instruction, and perform the decode process. The system clock is a counter which operates at a clock rate of 90 kHz, and the value of this counter is the time information which specifies the RTP packet that is the decoding object. When the RTP packet with the RTP time stamp whose value is less than the value of the system clock exists in the buffering means 202, the decode means 204 performs the decode process. The decode means 204 sends the system clock value to the de-packetizing means 203 and acquire the H.264/SVC elementary stream that is the decoding object.

In the NAL unit of which the acquired H.264/SVC elementary stream is composed, nal_unit_type that is the identifier for identifying each layer exists. The decode means 204 always checks this nal_unit_type to discriminate the arrival layer for each NAL unit. The decode means 204 checks whether the enhancement layer exists in order toward the higher hierarchical layer from the base layer. The enhancement layer of the lowermost layer among the hierarchical layers in which the enhancement layer does not exist is specified and the decoding is performed with respect to the enhancement layer lower than the lowermost layer and the base layer.

For example, when the video distribution device 100 transmits only the base layer, the decode means 204 decodes only the base layer. When the enhancement layer of a second hierarchical layer is not transmitted, the decode means 204 decodes only the base layer and the first enhancement layer based on the above description. As a result, even when a configuration of the enhancement layer is changed, in the exemplary embodiment, the decoding can be continued and load on a processor can be reduced in comparison with a case in which all layers are decoded at the time of fast forward reproduction. The bitmap data obtained by the decoding is sent to the display means 205 immediately.

In this exemplary embodiment, the explanation of a system in which the enhancement layer continuously existing from the base layer of the inputted H.264/SVC elementary stream can be decoded and all the enhancement layers are decode objects is made. However, this exemplary embodiment is not limited to this system. A configuration which has means for receiving the H.264/SVC elementary stream from the user by the decode means 204 separately and specifying the hierarchical layer of the enhancement layer that is the decoding object among the enhancement layers that can be decoded may be used.

The display means 205 is means for displaying the bitmap data on a screen. The display means 205 receives the bitmap data outputted by the decode means 205 and performs a display process on a video display device that is mounted on the video reception terminal 200 or connected to the video reception terminal 200. In this exemplary embodiment, a description about the video display device is omitted.

The display means 205 starts the display at a timing at which the bitmap data output is received from the decode means 204. The display means 205 continues to display the bitmap data until the next bitmap data is received. As a result, because the display means 205 continues to display the video until the next decoding is normally completed even when the decode means 204 does not output the decoded video, the degradation of the quality of the reproduced video can be suppressed.

The reproduction speed change instruction input means 206 is means for receiving the reproduction speed change request from the user. A press down of a fast forward button, an operation of dragging a slide bar with a mouse, an input of the reproduction multiplication ratio by using a key, or the like may be used as the reception method. The inputted reproduction speed change request is converted into the reproduction speed multiplication ratio and it is sent to the reproduction speed change request means 207.

The reproduction speed change request means 207 is means for requesting the change in the reproduction speed to the video distribution device 100 connected by the network 300. In this exemplary embodiment, a process for transmitting the PLAY method to which the Scale header is added by using the protocol of the RTSP is performed. A process for receiving a response indicating whether the fast forward can be performed from the video distribution device 100 is performed.

Figure 7:
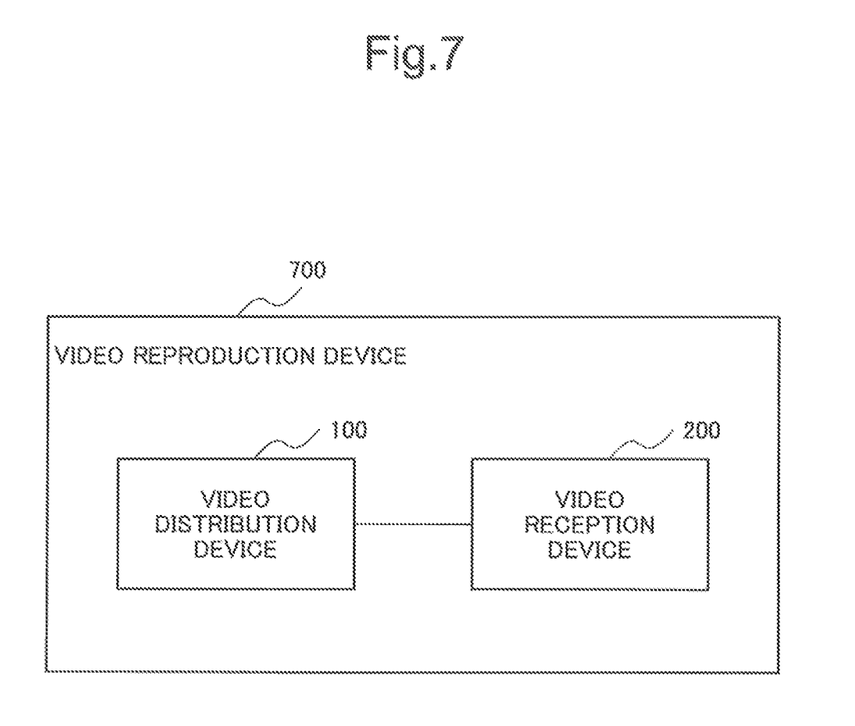
FIG. 7 is a schematic view showing a configuration of a video reproduction device according to an exemplary embodiment of the present invention.

In this exemplary embodiment, the change in the reproduction speed is performed in only the normal direction fast forward reproduction. However, the change in the speed may be performed at the time of the reverse reproduction. In this exemplary embodiment, a configuration in which the video distribution device 100 and the video reception device 200 are connected with each other via the network 300 is used. However, as shown in FIG. 7, a configuration in which the video distribution device 100 and the video reception device 200 are arranged in the video reproduction device 700 and the network is not used may be used.

Figure 8:
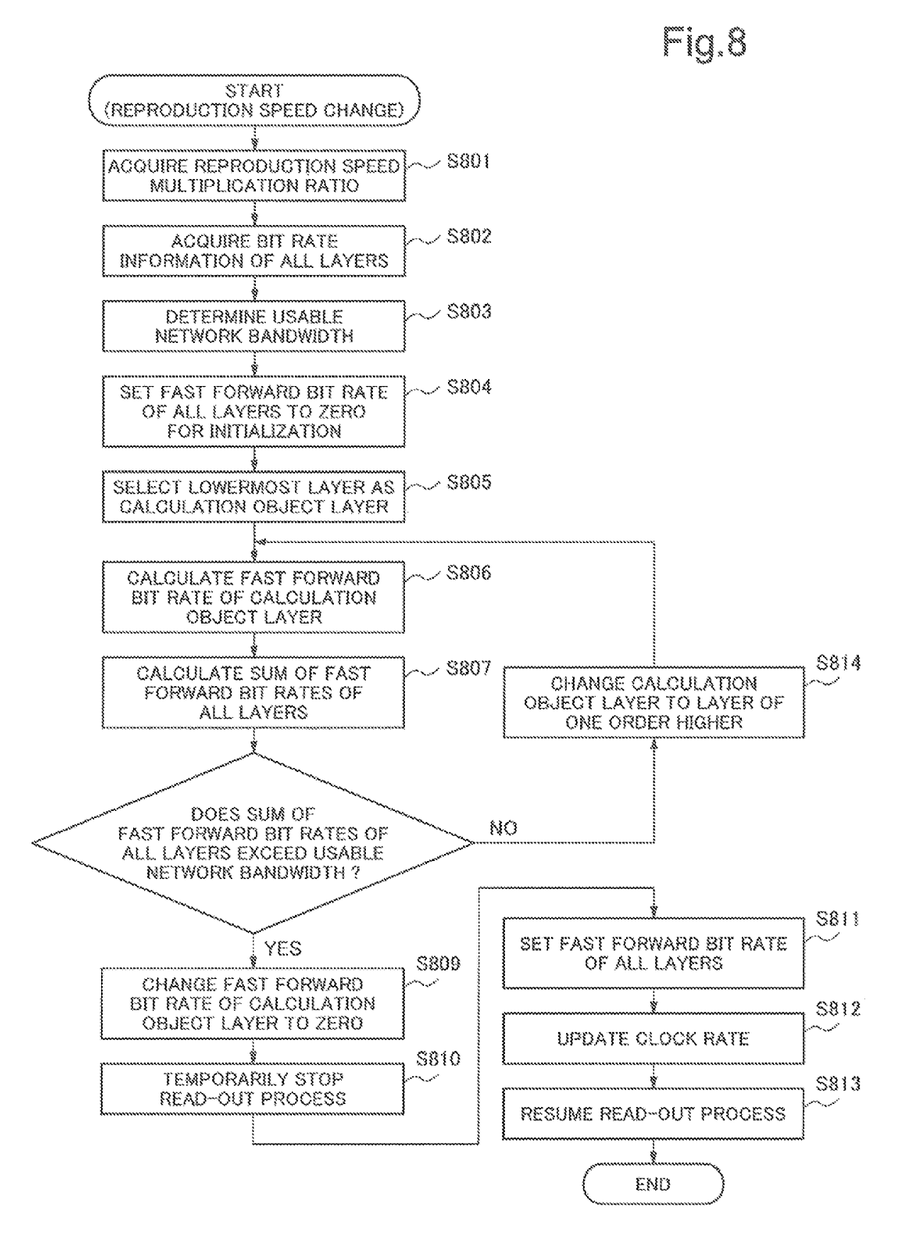
FIG. 8 is a flow chart showing a flow of a reproduction speed change process of a video distribution device according to an exemplary embodiment of the present invention.

Next, a video content fast forward process performed by the video distribution device will be described with reference to FIG. 8. FIG. 8 is a flow chart showing a flow of the reproduction speed change process of the video distribution device in this exemplary embodiment. FIG. 8 shows a process in which the reproduction speed change means 107 of the video distribution device 100 perform the fast forward at n-times speed. Further, an error process is not indicated in the flow chart of FIG. 8.

First, the reproduction speed change means 107 acquires the instruction of the fast forward at n-times speed from the video reproduction speed change request reception means 108 (Step S801). Next, the reproduction speed change means 107 acquires bit rate information of all layers of the content from the content information management means 106 (Step S802).

The reproduction speed change means 107 determines the usable network bandwidth (Step S803). This value is specified by a user or a value obtained by adding a bit rate of all layers may be used for this value. This value may be determined from a result obtained by measuring the usable network bandwidth of the network 300 currently connected.

Next, the reproduction speed change means 107 calculates the bit rate for reading out each layer for the fast forward reproduction. The read-out bit rate set at the time of fast forward reproduction is called a fast forward bit rate in this exemplary embodiment. The reproduction speed change means 107 sets a value of the fast forward bit rate of each layer to zero for initialization (Step S804). The reproduction speed change means 107 selects the lowermost layer as a layer of a first calculation object. In this case, the lowermost layer is the base layer (Step S805).

Next, the reproduction speed change means 107 stores a value obtained by multiplying the bit rate of the calculation object layer at the time of normal reproduction by n as the fast forward bit rate of the object layer (Step S806). The reproduction speed change means 107 calculates a sum of the fast forward bit rates of all layers (Step S807). The sum of the fast forward bit rates of all layers represents the use network bandwidth at the time of fast forward reproduction.

Next, the reproduction speed change means 107 determines whether the sum of the fast forward bit rates of all layers calculated before does not exceed the usable network bandwidth determined beforehand (Step S808).

When the sum of the fast forward bit rates does not exceed the usable network bandwidth ("NO" in step S808), the reproduction speed change means 107 changes the layer of the calculation object to a layer of one order higher (Step S814). For example, when the layer of the current calculation object is the base layer, the reproduction speed change means 107 designates the first enhancement layer as a new calculation object. When the layer of the current calculation object is the first enhancement layer, the reproduction speed change means 107 designates the second enhancement layer as the new calculation object. After this, the reproduction speed change means 107 performs a process in the step S806 and obtains the fast forward bit rate of the next layer.

On the other hand, when the sum of the fast forward bit rates exceeds the usable network bandwidth ("YES" in step S808), if the fast forward reproduction is performed, the distribution exceeding the specified usable network bandwidth is performed. When it is not allowed to exceed the bandwidth, a process for reading out the layer of the current calculation object cannot be performed. Therefore, the reproduction speed change means 107 changes the fast forward bit rate of the calculation object layer to zero (Step S809). Because the transmission layer cannot be increased any more, the process is moved to a setting change process after this process.

The reproduction speed change means 107 temporarily stops the read-out process in order to set the fast forward bit rate of each layer obtained in the above-mentioned process to the content read-out means 102 (Step S810). The reproduction speed change means 107 specifies the fast forward bit rate of each layer to the content read-out means 102 (Step S811). It means that at this time, the layer whose fast forward bit rate is set to zero is skipped without performing the read-out process. The reproduction speed change means 107 changes the clock rate held by the time information setting means 104 to a clock rate obtained by dividing the clock rate by n in order to change the increment of the time information added in the packet at the time of the fast forward reproduction (Step S812).

Finally, the reproduction speed change means 107 resumes the read-out process performed by the content read-out means 102 (Step S813). After this, the video distribution device 100 performs the fast forward reproduction at n-times speed.

This exemplary embodiment mentioned above has a first effect in which the fast forward reproduction can be performed without increasing the transmission bit rate. This is because only a part of the stream including the base layer is transmitted at a rate faster than a normal reproduction. Namely, in this exemplary embodiment, first, the transmission content is encoded by a scalable codec. As a result, the video reception device can perform the reproduction without transmitting a part of or all enhancement layers. In this exemplary embodiment, a bandwidth occupied by the enhancement layer whose transmission is stopped is assigned to increase the transmission rate of the base layer. As a result, the video distribution device can transmit the base layer stream at a rate faster than the normal reproduction rate without increasing the entire network use bandwidth.

This exemplary embodiment mentioned above has a second effect in which the decoding load of the reception device at the time of fast forward reproduction can be reduced. This is because the video reception device performs the decode process at a rate faster than the normal reproduction rate at the time of fast forward reproduction. On the other hand, in the distribution device, the transmitted stream is not the whole stream and it is a stream in which a part of or all enhancement layers do not exist. Therefore, in the video reception device, it is not necessary to perform the decode process of the enhancement layer that is not transmitted at the time of fast forward reproduction. For this reason, in the video reception device according to this exemplary embodiment, the decoding load can be reduced compared to the existing method with which all layers are decoded.

The exemplary embodiment mentioned above has a third effect in which a smooth video display can be realized at the time of fast forward reproduction. That is because the thinning process in a frame unit is not performed to the video transmitted by the video distribution device. Namely, the video distribution device realizes the reduction of bit rate at the time of fast forward reproduction by transmitting only the base layer or the base layer and a part of the enhancement layer instead of performing the thinning process in a frame unit. Therefore, the video reception device can display all the frames of the content during the fast forward reproduction.

The present invention has been described with reference to the exemplary embodiment. The present invention is not limited to the above-mentioned exemplary embodiment. The various changes which the person skilled in the art can understand in the scope of the present invention can be performed in configuration and detail of the present invention.

In other words, the present invention can be applied to a video distribution device such as a VOD server, a nDVR, or the like and a video reproduction device such as a HDD recorder, or the like. The present invention can be realized as a program which causes the video distribution device or the like to execute the above mentioned operation or a recording medium that records the program.

For example, the program executed by the video distribution device of this exemplary embodiment is composed of modules including the above mentioned each unit (reproduction speed change means, content read-out means, time information setting means, or the like), and the specific means are realized by using actual hardware. Namely, in this case, a computer (CPU) of the video distribution device reads out the program from the predetermined recording medium and executes it. Whereby the above mentioned each unit is loaded on a main storage device and the reproduction speed change means, the content read-out means and the time information setting means, and the like are generated on the main storage device.

In this exemplary embodiment, the program executed in the video distribution device may be configured so that the program is stored on the computer connected to the network such as the Internet or the like and downloaded via the network for provision. The above-mentioned program may be configured so that the program is provided or distributed via the network such as the Internet or the like.

The above-mentioned program may be configured so that the program is recorded in a computer-readable recording medium such as a floppy (registered trademark) disk, a hard disk, an optical disc, a magneto-optical disk, a CD-ROM, a CD-R, a DVD and a non-volatile memory card, or the like by using an installable format file or an executable format file and provided. The above-mentioned program may be configured so that the program is stored in a ROM or the like in advance and provided.

In this case, the program code itself which is executed after being readout from the above-mentioned recording medium or loaded through the communication line realizes the function of the above-mentioned exemplary embodiment. The recording medium which stores the program code configures the present invention.

DESCRIPTION OF SYMBOL 100 video distribution device
101 content storage means 102 content read-out means
103 packetizing means
104 time information setting means
105 transmission means
106 content information management
107 reproduction speed change means
108 reproduction speed change request reception means
200 video reception device
201 reception means
202 buffering means
203 de-packetizing means
204 decode means
205 display means
206 reproduction speed change instruction input means
207 reproduction speed change request means
300 network
700 video reproduction device

The invention claimed is:

1. A distribution device which distributes a video content including a basic signal and a extended signal that are hierarchically composed comprising:
  content read-out means for reading out the basic signal and the extended signal in the video content at mutually independent bit rates; and
  reproduction speed change means for changing a reproduction speed of the content by specifying a read-out bit rate for each signal to said content read-out means, wherein said reproduction speed change means:
  (I) acquires the bit rates of all layers composed the video content,
  (II) determines a usable bandwidth of a network,
  (III) stops, in a process in which the read-out bit rate of each signal is changed in order from the basic signal to the extended signal, the change in the read-out bit rate of each signal so that a sum of the read-out bit rates of each changed signal does not exceed the network usable bandwidth, and
  (IV) issues an instruction to stop the reading out of the extended signal in a hierarchical layer to which the change has not been performed and a hierarchical layer higher than the hierarchical layer,
  and the distribution device further comprising time information setting means for adding time information to the video content read out by said content read-out means, wherein
  said reproduction speed change means instructs said time information setting means to change the clock rate of the time information to a value obtained by dividing the clock rate of the time information by the multiplication ratio for the reproduction speed change when the reproduction speed change is determined.

2. The video distribution device according to claim 1 wherein
  the video distribution device includes:
  content information management means for managing bit rate information of the basic signal and the extended signal in the video content, and
  reproduction speed change request reception means for instructing said reproduction speed change means to change a reproduction frame rate, wherein
  said reproduction speed change means determines the read-out bit rate for each signal to read the video content in order to realize the reproduction frame rate specified by said reproduction speed change request reception means by using the bit rate information acquired from said content information management means.

3. The video distribution device according to claim 1 further comprising time information setting means for adding time information to the video content read out by said content read-out means, wherein
  said reproduction speed change means instructs said time information setting means to change a clock rate of the time information when reproduction speed change is determined.

4. The video distribution device according to claim 1 further comprising:
  content information management means for managing the bit rate information of the basic signal and the extended signal in the video content; and
  reproduction speed change request reception means for instructing said reproduction speed change means to change the reproduction frame rate, wherein
  said reproduction speed change means acquires the bit rate of each signal as the bit rate information from said content information management means, acquires a multiplication ratio of a video reproduction frame rate as the change instruction of the reproduction frame rate from said reproduction speed change request reception means, and calculates a product of the bit rate of the each signal and the multiplication ratio of the video reproduction frame rate and change the read-out bit rate.

5. The video distribution device according to claim 1 further comprising reproduction speed change request reception means for instructing said reproduction speed change means to change the reproduction frame rate, wherein
  said reproduction speed change request reception means receives a reproduction speed change request from a video reception device on the network.

6. The video distribution device according to claim 1, wherein
  the video content is a content encoded by a H.264/SVC codec,
  the basic signal is the base layer of the H.264/SVC, and
  the extended signal is the enhancement layer of the H.264/SVC.

7. A video reception device which receives a video content including a basic signal and a extended signal that are hierarchically composed from a video distribution device, comprising:
  reproduction speed change means for transmitting a reproduction speed multiplication ratio change request of the video content to the video distribution device defined in claim 1; and
  decode means for performing a video decode process according to time information added to the video content received from the video distribution device.

8. The video reception device according to claim 7 wherein said decode means reads out a signal identifier included in the inputted video content and discriminate a type of a signal, specifies the extended signal not included in the video content by repeating the discrimination, specifies the lowermost hierarchical layer among the extended signals not included in the video content, and performs a decode process to the extended signal in the specified lowermost hierarchical layer and a hierarchical layer lower than the specified lowermost hierarchical layer and the basic signal.

9. The video reception device according to claim 7 wherein said decode means changes a hierarchical layer of the extended signal that is an object of the decode process among the extended signals included in the inputted video content based on an instruction from a user.

10. The video reception device according to claim 7, wherein:
the video content is a content encoded by a H.264/SVC codec,
the basic signal is a base layer of a H.264/SVC, and
the extended signal is an enhancement layer of the H.264/SVC.

11. A video distribution system including a video distribution device which distributes a video content including a basic signal and a extended signal that are hierarchically composed and a video reception device which receives the video content distributed by the video distribution device wherein
the video distribution device is a video distribution device defined in claim 1, and
the video reception device comprises:
reproduction speed change request means for transmitting a reproduction speed multiplication ratio change request of the video content to the video distribution device; and
decode means for performing a video decode process in accordance with time information added to the video content received from the video distribution device.

12. The video distribution system according to claim 11 wherein
the video distribution device further comprises:
content information management means for managing bit rate information of the basic signal and the extended signal in the video content; and
reproduction speed change request reception means for instructing said reproduction speed change means to change a reproduction frame rate, wherein
said reproduction speed change means determines the read-out bit rate for each signal to read out the video content in order to realize the reproduction frame rate specified by said reproduction speed change request reception means by using the bit rate information acquired from said content information management means.

13. The video distribution system according to claim 11
the video distribution device further comprises time information setting means for adding time information to the video content read out by said content read-out means, wherein
said reproduction speed change means instructs the time information setting means to change a clock rate of the time information when the reproduction speed change is determined.

14. A video reproduction device in which a video distribution device for distributing a video content including a basic signal and a extended signal that are hierarchically composed and a video reception device for receiving the video content distributed by the video distribution device are included and both devices are connected by a bus,
wherein the video distribution device is a video distribution device defined in claim 1, and
the video reception device comprises:
reproduction speed change request means for transmitting a reproduction speed multiplication ratio change request of the video content to the video distribution device; and
decode means for performing a video decode process in accordance with time information added to the video content received from the video distribution device.

15. The video reproduction device according to claim 14 wherein
the video distribution device further comprises:
content information management means for managing bit rate information of the basic signal and the extended signal in the video content; and
reproduction speed change request reception means for instructing said reproduction speed change means to change a reproduction frame rate, wherein
said reproduction speed change means determines the read-out bit rate for each signal to read out the video content in order to realize the reproduction frame rate specified by said reproduction speed change request reception means by using the bit rate information acquired from said content information management means.

16. The video reproduction device according to claim 14 wherein
the video distribution device further comprises time information setting means for adding time information to the video content read out by the content read-out means, wherein
said reproduction speed change means instructs the time information setting means to change a clock rate of the time information when reproduction speed change is determined.

17. A video reception method with which a video content including a basic signal and a extended signal that are hierarchically composed is received from a video distribution device comprising:
a reproduction speed change request step in which a reproduction speed multiplication ratio change request of the video content is transmitted to the video distribution device defined in claim 1; and
a decode step in which a video decode process is performed according to time information added to the video content received from the video distribution device.

18. The video reception method according to claim 17, said decode step includes:
reading out a signal identifier included in the inputted video content and discriminating a type of a signal,
specifying the extended signal not included in the video content by repeating the discrimination,
specifying the lowermost hierarchical layer among the extended signals not included in the video content, and
performing a decode process to the extended signal in the specified lowermost hierarchical layer and a hierarchical layer lower than the specified lowermost hierarchical layer and the basic signal.

19. A non-transitory computer-readable medium used in a video reception device which receives a video content including a basic signal and a extended signal that are hierarchically composed from a video distribution device
the program causes a computer to realize:
a reproduction speed change function for transmitting a reproduction speed multiplication ratio change request of the video content to the video distribution device defined in claim 1; and
a decode function for performing a video decode process in accordance with time information added to the video content received from the video distribution device.

20. The non-transitory computer-readable medium according to claim 19, wherein said decode function reads out a signal identifier included in the inputted video content and discriminates a type of a signal, specifies the extended signal not included in the video content by repeating the discrimination, specifies the lowermost hierarchical layer among the extended signals not included in the video content, and performs a decode process to the extended signal in the specified lowermost hierarchical layer and a hierarchical layer lower than the specified lowermost hierarchical layer and the basic signal.

21. A video distribution method for distributing a video content including a basic signal and a extended signal that are hierarchically composed comprising:
- a reproduction speed change step in which a content reproduction speed is changed by specifying a read-out bit rate for each signal to a basic signal and an extended signal in the video content; and
- a content read out step in which the respective signals are read out at mutually independent bit rates according to the bit rate specified in the reproduction speed change step, wherein said reproduction speed change step includes:
(I) acquiring the bit rates of all layers composed the video content,
(II) determining a usable bandwidth of a network,
(III) stopping, in a process in which the read-out bit rate of each signal is changed in order from the basic signal to the extended signal, the change in the read-out bit rate of each signal so that a sum of the read-out bit rates of each changed signal does not exceed the network usable bandwidth, and
(IV) issuing an instruction to stop the reading out of the extended signal in a hierarchical layer to which the change of the read-out bit rate has not been performed and a hierarchical layer higher than the hierarchical layer, wherein the video distribution method includes a time information setting step in which time information is added to the video content read out in said content read out step, and in said reproduction speed change step, a clock rate of the time information used for addition of the time information in said time information setting step is changed when reproduction speed change is determined.

22. The video distribution method according to claim 21, the video distribution method further comprises:
- a content information management step in which bit rate information of the basic signal and the extended signal in the video content is managed; and
- a reproduction speed change request reception step in which an instruction of change of a reproduction frame rate is issued at the time of reproduction speed change in said reproduction speed change step, wherein in said reproduction speed change step, the read-out bit rate for each signal to read out the video content is determined in order to realize the reproduction frame rate specified in said reproduction speed change request reception step by acquiring and using the bit rate information managed in said content information management step.

23. The video distribution method according to claim 21 further comprising:
- a content information management step in which the bit rate information of the basic signal and the extended signal in the video content is managed; and
- a reproduction speed change request reception step in which the instruction of change of the reproduction frame rate is issued at the time of reproduction speed change in said reproduction speed change step, wherein said reproduction speed change step includes:
acquiring the bit rate of each signal as the bit rate information managed in said content information management step,
acquiring a multiplication ratio of a video reproduction frame rate as the change instruction of the reproduction frame rate, and calculating a product of the bit rate of the each signal and the multiplication ratio of the video reproduction frame rate and changing the read-out bit rate.

24. The video distribution method according to claim 21, wherein
the video distribution method includes a time information setting step in which the time information is added to the video content read out in said content read out step, wherein in said reproduction speed change step, the clock rate of the time information used for addition of the time information in said time information setting step is changed to a value obtained by dividing the clock rate of the time information by the multiplication ratio for the reproduction speed change when the reproduction speed change is determined.

25. A non-transitory computer-readable medium storing a program used in a video distribution device which distributes a video content including a basic signal and a extended signal that are hierarchically composed, the computer program causes a computer to realize:
- a reproduction speed change function for changing a content reproduction speed by specifying a read-out bit rate for each signal with respect to the basic signal and the extended signal in the video content; and
- a content read out function for reading out the respective signals at mutually independent bit rates in accordance with the bit rate specified by said reproduction speed change function, wherein said reproduction speed change function:
(I) acquires the bit rates of all layers composed the video content,
(II) determines a usable bandwidth of a network,
(III) stops, in a process in which the read-out bit rate of each signal is changed in order from the basic signal to the extended signal, the change in the read-out bit rate of each signal so that a sum of the read-out bit rates of each changed signal does not exceed the network usable bandwidth, and
(IV) issues an instruction to stop the reading out of the extended signal in a hierarchical layer to which the change of the read-out bit rate has not been performed and a hierarchical layer higher than the hierarchical layer, and wherein the program causes the computer to realize a time information setting function for adding time information to the video content read out by the content read out function, wherein said reproduction speed change function changes the clock rate of the time information used for addition of the time information by the time information setting function when the reproduction speed change is determined.

26. The non-transitory computer-readable medium according to claim 25 wherein
the program causes the computer to realize:
- a content information management function for managing bit rate information of the basic signal and the extended signal in the video content; and
- a reproduction speed change request reception function for issuing an instruction of change of a reproduction frame rate at the time of reproduction speed change by the reproduction speed change function, wherein said reproduction speed change function determines the read-out bit rate for each signal to read out the video content in order to realize the reproduction frame rate specified in the reproduction speed change request reception step by acquiring and using the bit rate information managed by the content information management function.

27. The non-transitory computer-readable medium according to claim 25, the program causes the computer to further realize:

a content information management function for managing the bit rate information of the basic signal and the extended signal in the video content; and the reproduction speed change request reception function for issuing an instruction of the change of the reproduction frame rate at the time of reproduction speed change by the reproduction speed change function; wherein said reproduction speed change function acquires the bit rate of each signal as the bit rate information managed by said content information management function, acquires a multiplication ratio of a video reproduction frame rate as the change instruction of the reproduction frame rate by said reproduction speed change request reception function, and calculates a product of the bit rate of the each signal and the multiplication ratio of the video reproduction frame rate and changes the read-out bit rate.

28. The non-transitory computer-readable medium according to claim 25, the program causes the computer to realize a time information setting function for adding the time information to the video content read out by said content read out function, wherein said reproduction speed change function changes the clock rate of the time information used for addition of the time information by said time information setting function to a value obtained by dividing the clock rate of the time information by the multiplication ratio for the reproduction speed change when the reproduction speed change is determined.

29. A video reception device which receives a video content including a basic signal and an extended signal that are hierarchically composed from a video distribution device, comprising:

reproduction speed change means for transmitting a reproduction speed multiplication ratio change request of the video content to the video distribution device; and decode means for performing a video decode process according to time information added to the video content received from the video distribution device, wherein said decode means reads out a signal identifier included in the inputted video content and discriminate a type of a signal, specifies the extended signal not included in the video content by repeating the discrimination, specifies the lowermost hierarchical layer among the extended signals not included in the video content, and performs a decode process to the extended signal in the specified lowermost hierarchical layer and a hierarchical layer lower than the specified lowermost hierarchical layer and the basic signal, and wherein the video distribution device comprises:

content read-out means for reading out the basic signal and the extended signal in the video content at mutually independent bit rates; and reproduction speed change means for changing a reproduction speed of the content by specifying a read-out bit rate for each signal to said content read-out means, wherein said reproduction speed change means:

(I) acquires the bit rates of all layers composed the video content, (II) determines a usable bandwidth of a network, (III) stops, in a process in which the read-out bit rate of each signal is changed in order from the basic signal to the extended signal, the change in the read-out bit rate of each signal so that a sum of the read-out bit rates of each changed signal does not exceed the network usable bandwidth, and (IV) issues an instruction to stop the reading out of the extended signal in a hierarchical layer to which the change has not been performed and a hierarchical layer higher than the hierarchical layer.

30. A non-transitory computer-readable medium used in a video reception device which receives a video content including a basic signal and an extended signal that are hierarchically composed from a video distribution device, wherein the program causes a computer to realize:

a reproduction speed change function for transmitting a reproduction speed multiplication ratio change request of the video content to the video distribution device; and a decode function for performing a video decode process in accordance with time information added to the video content received from the video distribution device, wherein said decode function reads out a signal identifier included in the inputted video content and discriminates a type of a signal, specifies the extended signal not included in the video content by repeating the discrimination, specifies the lowermost hierarchical layer among the extended signals not included in the video content, and performs a decode process to the extended signal in the specified lowermost hierarchical layer and a hierarchical layer lower than the specified lowermost hierarchical layer and the basic signal, and wherein the video distribution device comprises:

content read-out means for reading out the basic signal and the extended signal in the video content at mutually independent bit rates; and reproduction speed change means for changing a reproduction speed of the content by specifying a read-out bit rate for each signal to said content read-out means, wherein said reproduction speed change means:

(I) acquires the bit rates of all layers composed the video content, (II) determines a usable bandwidth of a network, (III) stops, in a process in which the read-out bit rate of each signal is changed in order from the basic signal to the extended signal, the change in the read-out bit rate of each signal so that a sum of the read-out bit rates of each changed signal does not exceed the network usable bandwidth, and (IV) issues an instruction to stop the reading out of the extended signal in a hierarchical layer to which the change has not been performed and a hierarchical layer higher than the hierarchical layer.

* * * * *